Nov. 29, 1927. 1,651,105

C. G. SCHENKEN

DEMOUNTABLE WHEEL

Filed Sept. 8, 1926

Carlton G. Schenken
INVENTOR

BY Victor J. Evans
ATTORNEY

Patented Nov. 29, 1927.

1,651,105

UNITED STATES PATENT OFFICE.

CARLTON G. SCHENKEN, OF WASHINGTON, DISTRICT OF COLUMBIA.

DEMOUNTABLE WHEEL.

Application filed September 8, 1926. Serial No. 134,282.

The object of this invention is the provision of a simple means for easily, quickly and securely attaching the demountable wheels of vehicles, such as automobiles, and as readily permitting the removal of such wheels.

In the ordinary construction the hub flange for vehicles having demountable wheels is provided with a comparatively large number of threaded studs, the disc wheel being provided with an equal number of openings to receive the studs therethrough. It is somewhat of a task to align the openings with the studs, and a task that requires a comparatively great length of time in screwing the nuts home on the threaded studs or bolts, and a similar length of time in unscrewing the nuts when the wheel is to be removed. With my present invention I propose to provide the hub flange with only two headed studs and a single bolt, the same being mounted and associated in a manner whereby the screwing of the single nut on the bolt will not only exert a binding action against the disc wheel, but will cause the heads of the studs to be brought into frictional contact therewith so that the wheel is easily, quickly and firmly secured on the hub flange.

A still further object is the provision of a means for securing a disc wheel to the hub flange of a vehicle, that comprises a swingable plate mounted on the rear face of the flange and carrying spaced studs which may be integrally formed with or provided with removable heads, and which studs are pivotally associated with the plate. The said plate is also provided with a pivotally connected bolt and the disc wheel is provided with suitable openings, to receive therethrough the studs and the bolt. A nut is screwed home on the bolt, and contacts with and cants the plate to bring the heads of the studs into tight frictional contact with the outer face of the disc wheel whereby the disc wheel may be easily and quickly secured on the hub and as readily removed therefrom when occasion requires.

With the above broadly stated objects in view and others which will present themselves as the nature of the invention is better understood, the improvement further consists in certain novel features of construction, combination and operative association of parts, one of a number of satisfactory embodiments of which is disclosed by the accompanying drawings.

Figure 1:
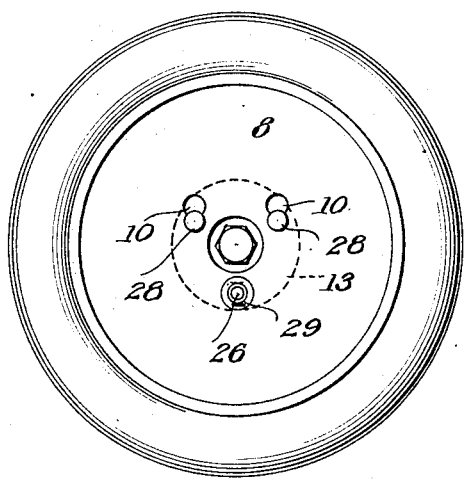
Figure 1 is an elevation of a disc wheel mounted on a vehicle hub in accordance with this invention.
Figure 2:
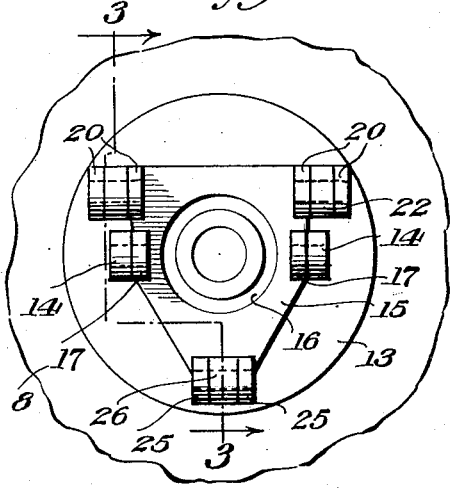
Figure 2 is a rear elevation of the hub with the improvement associated therewith, the figure also disclosing a part of the disc wheel.

A tire carrying disc wheel of the ordinary construction is disclosed by the drawings and is indicated by the numeral 8. In one form of my invention the wheel 8, above and at the opposite sides of its central hub receiving opening 9, is provided with key-hole slots 10—10, and centrally below the hub opening 9 the disc wheel is provided with a bolt opening 11.

The hub 12 is of the usual construction, and is attached to the spindle or shaft in the usual manner. The hub is provided with the usual flange 13, and this flange, at the opposite sides of the hub has on its inner face ears 14.

The numeral 15 designates the swingable plate that constitutes one of the important features of my invention. The plate is centrally formed with an opening 16 through which the hub 12 is received, the said plate at the opposite sides of the opening being formed with ears 17 disposed in lapping relation with the ears 14, and through these aligining ears there is passed a pivot 18. It will thus be noted that the plate 15 is swingably mounted on the hub flange 13. The plate 15, above the ears 17, has outwardly extending corners 19, and these extensions are integrally formed with spaced pairs of ears 20. These pairs of ears have pivotally secured therebetween, as at 21, the eye end portions of studs 22. The studs pass through elongated openings 23 in the said corner portions of the plate 15. From its hub receiving openings 16, the plate 15 is preferably reduced, that is, the said plate has its edges cut inwardly and merge into a straight lower portion 24. The portion 24 is provided with a pair of ears 25, between which ears there is received and pivoted the rounded headed portion of a bolt 26, the said bolt passing through an elongated opening 27 in the part 24 of the plate 15.

It is to be noted that all of the ears on the plate 15 extend in the same direction as do the studs 22.

In this embodiment of the improvement the studs 22 have outer disc-like heads 28.

The wheel 8 is arranged so that the heads 28 of the studs 22 will pass through the wider passages of the key hole slots 10. The wheel is then moved so that the studs are received in the restricted passages of the key-hole slots or openings 10 and the bolt 26 is received through the opening 11. A nut 29 is screwed on the bolt 26, and forces a lock washer 30 against the outer face of the disc wheel 8. The screwing home of the bolt will swing or cant the plate 15 so that the heads 28 of the studs will be brought into tight frictional contact with the said outer face of the wheel, and such screwing of the nut will compress the lock washer 30 between the said wheel and the said nut. In this manner it will be seen that the wheel is easily, quickly and securely attached to the hub, it being, of course, apparent that the wheel may be as easily removed. The tight frictional engagement of the heads 28 with the wheel 8, and the similar engagement of the nut and lock washer with the said wheel will hold the wheel positively on its mount, regardless of the jars to which the same is subjected when traveling over uneven road surfaces, and the wheel cannot be disassociated from the hub until the nut 29 is turned in an unscrewing direction.

Figures 3, 7:
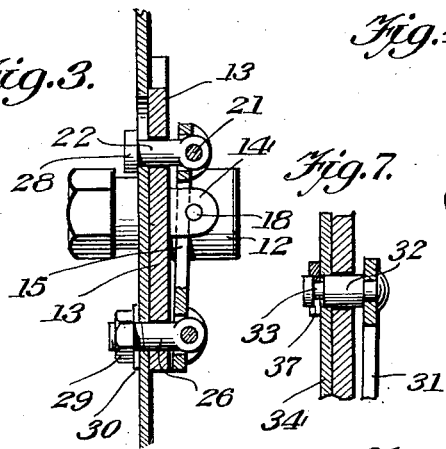
Figure 3 is a sectional view on the line 3—3 of Figure 2.
Figure 7 is a sectional view approximately on the line 7—7 of Figure 6.
Figure 4:
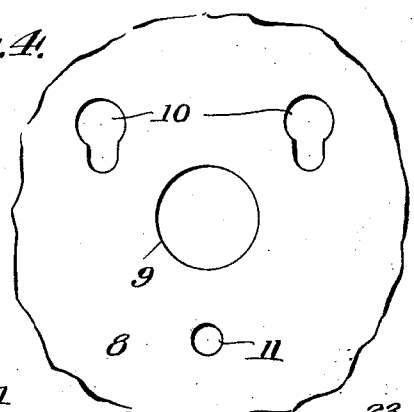
Figure 4 is an elevation of the central portion of the disc wheel.
Figure 6:
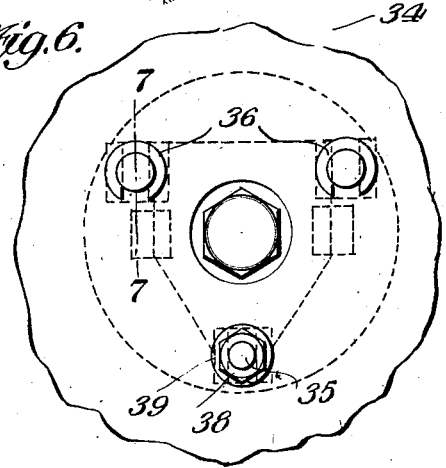
Figure 6 is a detail elevation of the central portion of a wheel to illustrate a slight modification.
Figure 5:
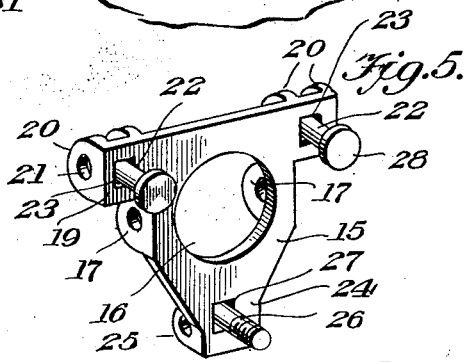
Figure 5 is a perspective view of the improvement, per se.

In Figures 6 and 7 I have illustrated a slight modification, the structure in the main being similar to that previously described. In this instance I do not pivotally secure the studs to the swingable plate nor do I find it necessary to pivotally associate the bolt with the said plate. The plate, for distinction, is indicated by the numeral 31 and carries at its upper corners studs 32. The studs may be loosely mounted for slight swinging on the plate but are held from direct longitudinal movement thereon. These studs have their upper ends provided with annular depressions 33, and the said studs are designed to pass freely through round openings in the disc wheel 34. The bolt 35, carried by the said plate 31, also passes through a round opening below and centrally with respect to the openings that receive the studs 32 therethrough. When the parts are so arranged I pass over the projecting end of each stud 32 a horseshoe washer 36. The central portion of each of these washers is reduced from its outer face, as disclosed by Figure 7 of the drawings, and indicated by the numeral 37. The reduced portion is received in the annular depression 33 and may frictionally engage with the walls provided thereby. The nut 38 which is screwed on the bolt 37 contacts with a lock washer 39, and the screwing home of the bolt will swing the pivotally supported plate to cant the plate to cause the studs 32 to force the horseshoe washers into frictional engagement between the outer and what may be termed the headed end of the bolt and the disc wheel. Such turning of the nut 38, of course, compresses the lock washer so that a locking engagement is thus produced between the nut and the disc wheel. The modified form of my improvement has all of the advantages of the first mentioned form. It is, of course, to be understood that the wheel is supported on the hub and that the means herein described serve mainly for locking the wheel on the hub, and thus the studs and bolts of my improvement are not subjected to unnecessary strain. Disc wheels embody a natural resiliency, and, therefore, I may dispense with the employment of the lock washers inasmuch as there will be at all times a frictional engagement between the nuts which engage the bolts and the wheel and such engagement will prevent the unscrewing of the bolts. To assist in this the threads of the bolt may be cut so that the turning of the wheel and the frictional contact of the said wheel with the cuts will have a tendency to screw the nuts home.

The simplicity of my construction, the ease in which the same may be operated to lock or release a wheel from a hub will, it is thought, be fully understood and appreciated by those skilled in the art to which such invention relates. Of course, I do not wish to be limited to the precise details of construction herein set forth and, therefore, hold myself entitled to all such changes and modifications therefrom as fall within the scope of what I claim, provided such changes do not depart from the spirit or sacrifice any of the advantages of the invention.

Having described the invention, I claim:

1. Means for securing a wheel on a hub, comprising elements carried by the hub and passing through the wheel for gripping engagement therewith and means passing through and adjustably engaging the wheel and associated with the first elements to impart a longitudinal movement thereto to bring the same into tight gripping engagement with the wheel.

2. Means for securing a wheel on the hub thereof, comprising a swingable member on the hub, wheel engaging gripping elements thereon, and adjustable means associated with said swingable member passing through and engaging the wheel for canting the swingable member to bring the gripping elements into gripping engagement with the wheel.

3. Means for removably securing a wheel on the hub therefor, comprising a plate swingably mounted on the hub, studs carried by the plate and received through the wheel, heads for the studs, a bolt member disposed away from the studs and received through the wheel, and a nut screwed on the bolt for swinging the plate to bring the heads of the studs and the nut in tight frictional contact with the wheel.

4. The combination with a disc vehicle wheel, and a flanged hub therefor, said wheel having spaced key hole slots therethrough, and a bolt opening below the slots, a plate pivotally supported on the hub flange, headed studs carried by the plate, and designed to be received through the key hole slots, a bolt member carried by the plate to be received through the bolt opening in the wheel and a binding nut designed to be screwed on the bolt when the studs have their shanks received in the restricted openings of the key hole slots, whereby to swing the plate to bring the heads of the studs into tight frictional contact with the wheel.

5. Means for securing a wheel on the hub therefor, in which said wheel has a pair of spaced key hole slots, and a bolt opening disposed away from but between the slots and further wherein the hub is provided with a flange that is formed with ears, a plate having an opening to receive the hub therethrough, ears on the plate pivotally secured to the ears of the hub flange, other ears on the upper corners of the plate, headed stud members passing freely through the said corners of the plate and pivotally secured between the last mentioned ears, said plate having its lower end reduced and, provided with spaced ears, a bolt member passing freely through the plate and pivotally secured between said ears, said studs designed to be received through the keyhole slots and to have their shanks arranged in the restricted passages thereof, the bolt adapted to be passed through the bolt opening in the wheel, a lock washer on the bolt, and a nut designed to be screwed on the bolt, as and for the purpose set forth.

6. Means for removably securing a disc wheel on a hub, comprising elements swingably supported on the hub and passing through the wheel for gripping engagement therewith, a bolt member associated with said swingable means and also designed to pass through the wheel, a nut screwed on the bolt for influencing the swingable member to bring the elements into tight gripping engagement with the wheel and said nut, by virtue of its frictional contact with the wheel, being held from unscrewing on the bolt.

In testimony whereof I affix my signature.

CARLTON G. SCHENKEN.